United States Patent [19]

Daintrey et al.

[11] 4,380,383
[45] Apr. 19, 1983

[54] COPYING METHOD AND APPARATUS

[75] Inventors: Joseph W. Daintrey, London; John Rushton, Wickford; Michael Willis, London, all of England

[73] Assignee: Gestetner Manufacturing Limited, London, England

[21] Appl. No.: 206,904

[22] Filed: Nov. 14, 1980

[30] Foreign Application Priority Data

Nov. 16, 1979 [GB] United Kingdom ............... 7939698

[51] Int. Cl.³ .......................................... G03G 15/00
[52] U.S. Cl. .................................. 355/3 R; 355/77; 430/31
[58] Field of Search ............... 355/3 R, 11, 77, 3 BE, 355/1; 430/31, 54

[56] References Cited

U.S. PATENT DOCUMENTS

| | | | |
|---|---|---|---|
| 3,508,823 | 4/1970 | Gundlach et al. | 355/3 R |
| 3,526,191 | 9/1970 | Silverberg et al. | 355/3 R X |
| 3,615,128 | 10/1971 | Bhagat | 355/3 R |
| 3,705,768 | 12/1972 | Moraw | 355/11 X |
| 3,752,573 | 8/1973 | Miller | 355/11 |
| 3,836,363 | 9/1974 | Plutchak | 430/46 |
| 4,000,957 | 1/1977 | Ruhland | 355/3 FU |
| 4,003,651 | 1/1977 | Hashida et al. | 355/15 |
| 4,129,373 | 12/1978 | Ogura et al. | 355/11 X |
| 4,131,359 | 12/1978 | Honda | 355/15 |
| 4,141,648 | 2/1979 | Gaitten et al. | 355/15 |
| 4,180,318 | 12/1979 | Matsumoto et al. | 355/11 |
| 4,297,422 | 10/1981 | Sato | 430/54 |

Primary Examiner—R. L. Moses
Attorney, Agent, or Firm—Fleit, Jacobson & Cohn

[57] ABSTRACT

A copying system and apparatus wherein a first electrostatic image of an original is formed and developed on a first photoconductive surface, and second electrostatic images of the developed image are repeatedly formed on a second photoconductive surface by illumination of the first surface. The second images, which can be formed at high speed, are developed and transferred to copy material.

19 Claims, 7 Drawing Figures

COPYING METHOD AND APPARATUS

DESCRIPTION

This invention relates to a method of producing copies and to copying apparatus.

It is now well established practice to produce copies of an original such as a paper or book by scanning the original with light and reflecting an image of it onto a pre-charged drum or other surface coated with a photoconductive material, whereon the surface is discharged in areas corresponding to light parts of the original and remains charged in areas corresponding to dark parts of the original, to give an electrostatic image of the original. This image is usually then developed using a toner in the form of a powder which is attracted to the charged areas, and the powder image is transferred to a plain paper copy sheet which is brought into contact with the surface. The copy sheet is then forwarded and the toner fused in place thereon while the drum surface is cleaned ready for pre-charging in the next copying cycle.

The factor which limits the speed at which multiple copies of an original can be produced with such a system is the scanning of the original, which either involves moving the original to and fro on a carriage or reciprocating a part of the optical system, usually a mirror or mirrors. In these conventional arrangements, the limiting speed is about 60 copies per minute (cpm), although the normal speed is nearer 20 cpm.

There have recently been several proposals for increasing the copying speed of plain paper copiers, for instance to about 100 cpm. However, such proposals have been of a somewhat radical nature. For instance, it has been suggested to provide the photoconductive surface on an endless belt which is flat in the exposure area but continues to move during exposure. Exposure is in this case brought about using a xenon flash and successive exposures are close to one another on the surface of the belt, upon which the images are then developed and from which the developed images are transferred to copy sheets. The drawback to this arrangement is the expense and weight of the equipment for generating the flash exposure and for driving the belt.

Another recent proposal involves the use of a magnetic memory disposed on a high speed rotating drum but this again is expensive and difficult to construct.

An aim of this invention is to allow high speed copying, for instance at 60 to 100 cpm or more using a simple, relatively cheap, method and apparatus.

Most generally stated, the invention involves the use of a first photoconductive surface on which a "memory" image of the original is formed, and this memory image is then used, for instance at high speed, as the effective original for copying using a second photosensitive surface.

In one aspect of the present invention therefore, there is provided a copying system including means to form and develop an electrostatic image of an original on a first, memory, photoconductive surface, means repeatedly to form on a second photoconductive surface second electrostatic images of the developed image on the first surface, means to transfer the second images from the second surface to copy material, and means to develop the second images.

The invention also provides a method of producing copies of an original by forming and developing an electrostatic image of the original on a first, memory, photoconductive surface, repeatedly forming on a second photoconductive surface second electrostatic images of the developed image on the first surface, transferring the second images from the second surface to copy material and developing the second images.

Normally and preferably, the first and second photoconductive surfaces are endless surfaces, being for instance on belts or, most preferably, drums, so that the two surfaces can be moved continuously while the second images are formed from the first. The copy material will normally be paper, preferably in pre-cut sheets. The development of the second images will preferably take place on the second surface so that it is developed images that are transferred to the copy material, but alternatively the charge images can be transferred to and developed on the copy material.

With the invention an electrostatic image of an original is initially formed and developed on the first, memory, surface in a first stage of the method. This developed image, which is only formed once in respect of each original, acts as a memory of the original and is used in a second stage of the method, which can be regarded as a duplicating stage, as many times as required to form images on the second surface, and it is these second images which are transferred to copy material and are developed. The second or duplicating stage in the method can be similar to conventional copying arrangements with the difference that the object, or effective original, is provided on the first surface which, if it is a belt or drum, can be moved continuously with no reciprocation or oscillation being involved to limit copying speed. This means that after the first stage of the method, which can be conducted carefully and relatively slowly, the second stage can be continued uninterrupted for so long as desired at high speed.

The invention thus provides a very simple but satisfactory solution to the problems associated with high speed copying by allowing elimination of the requirement for some part to reciprocate or oscillate during such copying except at the very outset for a given original. Only relatively simple and proven technology need be employed. Furthermore, high quality copies can be obtained because, in view of the high speed of the second, duplicating, stage, it is possible to allow for the first stage of the method to be executed relatively slowly and accurately, so that a first image of high quality can be obtained without the necessity of employing highly sophisticated and expensive optical, developing and scanning equipment.

In general, each of the first and second stages can be similar to a conventional copying process with some appropriate differences. So far as the first stage, that is the formation of the memory image on the first surface, is concerned, therefore, this surface is charged and then exposed so as to acquire an electrostatic image of the original, and then developed with toner or developer powder. This powder will in general not, however, be fused in place. Scanning can be by lens or mirror translation or rotation or by motion of the original, and the first surface will rotate or move in synchronism with the scan through the imaging or exposure station at which the image of an incremental part of the original in the scan is reflected by an optical system. In this first stage, the first surface will normally move relatively slowly so that a high quality image can be obtained and account can be taken of the need to translate the original or some part of the scanning system. As multiple copying will generally be required, there will be no need for the moved part of the scanning system to "flyback" at a fast speed to its starting position. In the second stage, the second surface is charged, and then exposed to the memory image which is the effective original, thus acquiring an electrostatic image of the real original. This can be developed with toner powder applied to the areas which remain charged and transferred to copy material held against the surface, whereon the second surface is cleaned to remove any residual toner ready for charging again. The toner can be transferred to the copy sheet and then fused or set on the copy material downstream of the transfer station, for instance by heated rollers or lamps. The difference between this second stage and a conventional copying process is, it will be appreciated, that scanning of the effective original can be brought about by continuous uninterrupted movement thereof, with no oscillation or reciprocation being involved. This means that at this stage both surfaces involved can move fast, much faster for instance than the first surface does in acquiring the memory image, and in general the surface speed of the two surfaces will be the same. Instead of developing the second images on the second surface and transferring them, for instance to plain copy paper, the images can alternatively be transferred to dielectric copy paper and developed thereon.

In order correctly to provide copies on the copy material, the image on the second surface must be "wrong reading". The image on the first surface can be either "right" or "wrong" reading, the optical systems being designed accordingly.

It may be noted that the first surface will preferably be capable of being driven at two speeds, firstly at a relatively slow speed to have the image of the original formed thereon and secondly at a relatively high speed, in synchronism with the second drum, when making multiple copies. Image elongation and/or shortening can however be employed in either or both stages of the method, by, in the first place, moving the first surface faster or slower than the scanning speed and in the second place moving the two surfaces at different speeds.

It is preferable to employ a single developer/cleaner unit for the first surface because this will allow a closed system to be operated with little developer powder or toner being lost and little dust generation. This arrangement can be economical for short and long runs and a specifically designed developer powder can be used. Further, because the developer powder in the first stage is used only for development, and is not to be fused onto the first surface, emphasis can be accorded to improving the development properties of this powder without regard to the fusing and transfer properties (there is normally a compromise in this respect) so that an excellent quality image of good density can be obtained. Although a single component developer powder is preferred for this first stage, a two component powder is a possible alternative. It may be mentioned that despite the powder not being fused to the first surface, no problems have been met in retaining it electrostatically on a drum even when this rotates at up to 100 rpm. To assist in cleaning, at the end of the multiple copying of a given original, an AC voltage can be applied to the first surface to discharge any remaining charged areas. In presently contemplated constructions the developer and cleaner, whether or not unitary, are movable away from the first surface when not employed, but this is not essential if the developer or cleaner can be disabled during the duplicating, second, stage so as not to disturb the developed image on the first surface.

For the second surface, any appropriate photoconductive material such as pure or doped selenium, zinc oxide and cadmium sulphide can be employed. The properties required of it are essentially those desired in conventional electrostatic copying. While the same is essentially true of the first surface, there are other factors to be taken into account, because the first surface, when developed, should display the optical contrast necessary for it to act as the memory of the original.

For instance, zinc oxide or cadmium sulphide with binders, or indeed selenium, pure or alloyed, or other photoconductors well known to those skilled in the art can be employed, but a toner of a contrasting colour will be necessary if colour contrast is relied on to allow the memory image to be read, while transparent or transluscent photoconductors, for instance organic photoconductors which are flexible and thus particularly appropriate if the first surface is on a belt, with a light source behind the toned image, can be mentioned as other possibilities. The major alternative to colour contrast is based on the phenomenon of specular reflection, and it is in fact preferred to rely on this in the present invention.

As an example of specular reflection, selenium and selenium alloys offer very smooth, shiny surfaces which reflect light faithfully, or in other words like a mirror. Toner material, on the other hand, particularly if it is not fused, absorbs and scatters light, which allows this contrast in reflectivity to be employed in "reading" the memory image of the original on the first surface.

If a light source is arranged to illuminate the first surface, therefore, light will be reflected from the non-imaged, undeveloped areas and can be passed to a corresponding part of the second surface through an optical system. Imaged and developed areas, however, will not reflect the light, so that corresponding parts of the second surface will remain charged. The contrast obtained, which corresponds of course to the contrast of white to black in the original, can be exceedingly good, because selenium is highly reflective and the toned image can be dark and very diffuse. The illumination is arranged so that the selenium reflects a large proportion of light and the toner does not. In fact, specular reflection is also more efficient than mere colour discrimination in that the reflection is more concentrated so that a lower powered illuminating lamp can be employed.

The optical system between the original and first surface can be conventional, as can that between the two surfaces. Advantages can be obtained, however, by using between the surfaces a lens arrangement comprising a bundle of fibres which are graded as to refractive index from the centre towards the outside in each fibre. Each fibre is 1 to 2 mm in diameter and the fibres are very closely packed together. The arrangement provides low transmission losses and offers improvements in this respect over normal lenses. It also offers a short focal length allowing the two surfaces to be close together and the copier to be compact. Such a lens arrangement used where specular reflection is employed will assist in discriminating between light truly reflected from the surface, and any light scattered from toner, thus further improving the reproduction.

In order that the invention may be more clearly understood the following description is given, by way of example only, with reference to the accompanying drawings in which.

Figure 1:
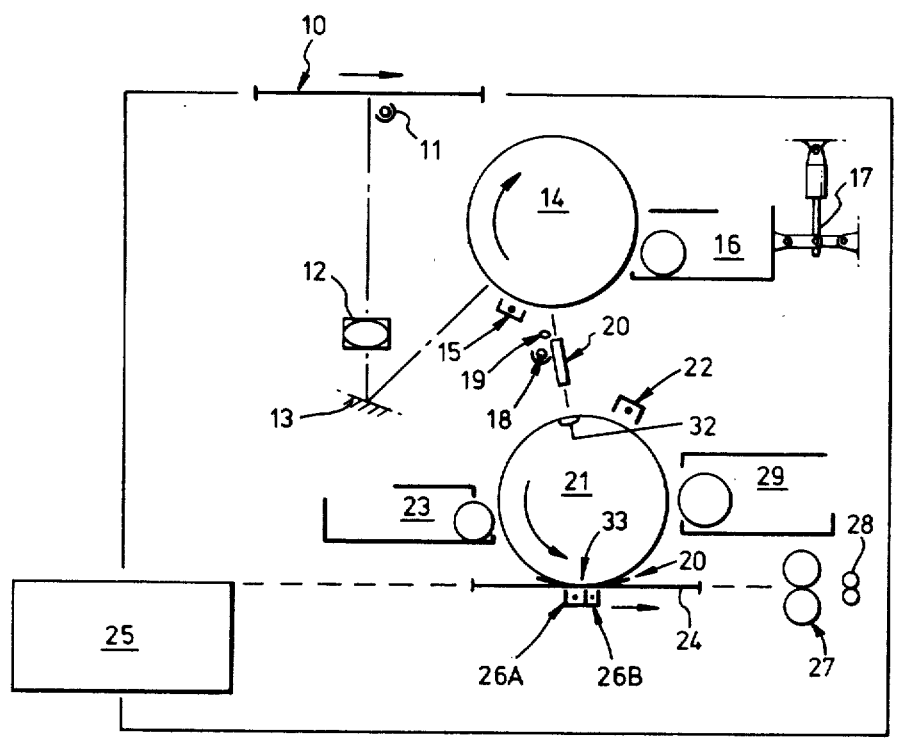
FIG. 1 is a diagrammatic view of one embodiment of apparatus according to the invention.

Shown in FIG. 1 is a copying machine having a movable platten 10 on which an original is to be placed to be moved to and fro and to be exposed to light from an exposure lamp 11. The original is thus scanned so that light from incremental parts of it is reflected via a lens 12 and a mirror 13 to the surface of a rotating drum 14. Drum 14 is a first, memory, drum and has a photoconductive surface, preferably of selenium. In the embodiment shown the drum rotates clockwise and the image from the moving original impinges on part of the surface of the drum just after that part of the surface has passed a charging station 15 at which the surface receives a uniform charge from a corona wire in known manner. The reflected image of the original discharges the surface of the drum in light areas, but not in dark areas so that an electrostatic charge image is obtained. This image of the original is developed with a developer powder by a developing and cleaning unit 16 which is movable towards and away from the drum 14 by a toggle arrangement 17. The developer or toner powder is preferably of the single component type and is brought into contact with the drum so that it adheres to the drum in the charged areas. Once reproduction of the original is made in this way on the drum 14 the developer unit is withdrawn by activating the toggle 17, and the first stage of the method of the invention is completed.

Subsequently, as many copies as may be desired can be made using the developed image on drum 14 as the effective original in what is in effect a duplicating step.

Shown at 18 is a further lamp arranged to illuminate, via a lens 19, the developed image on the drum 14 which is scanned by reason of rotation of that drum. A reflection of that image is passed via a lens arrangement 20, to an imaging station 32 on a second or copying drum 21 with a photoconductive surface, preferably also of selenium, which drum can be rotated in exact unison with the drum 14 but, as indicated, in the opposite direction. The second drum 21 is associated with conventional units, namely a charging device 22 immediately preceding the imaging station 32 which, in the direction of rotation is followed by a developer unit 23, a transfer station 33 and a cleaning unit 29. The charging unit 22 is of known corona type, the developer unit 23 can apply a toner powder, preferably of the two component type, to the charge image. The cleaning unit 29 can also be of conventional type, for instance including a fur brush cleaned by a vacuum system having an air filter.

Paper copy sheets 24 are supplied from a stack 25 along a conveying path to the transfer station 33, at which they contact the drum to have the developed image transferred to them. At the transfer station there is a first corona wire 26A to assist transfer of toner to the paper, and a second AC corona wire 26B which together with a blade 30 assists in separating paper from the drum. The copy paper 24 is then further forwarded between a pair of heated fusing rolls 27 and a pair of output rolls 28.

Once the required predetermined number of copies is made, the developing and cleaning unit 16 associated with the first drum 14 is brought into contact therewith to clean off the developer powder and to return the powder to a reservoir so that it can be recycled and used in connection with forming the memory image of the next original to be copied. Preferably the first drum is fully discharged before the next charging step.

Many variations in the above construction can be adopted, for instance instead of moving the original, an oscillating optical system can be employed, having, for instance, a movable lamp and mirrors and/or an oscillating lens or mirror arrangement. While the lens 12 and the mirror 13 focus an image of the original onto the drum 14 in a "right reading" manner, a "wrong reading" imaging step could be used, the important point being that the image on the second drum should be "wrong reading" so that the actual copies are "right reading".

The heated rollers 27 can be of conventional construction, i.e. coated metal, or of a material known as "PTC", which has a positive thermal coefficient of electrical resistance, and can thus be electrically heated, until a certain predetermined temperature is reached whereon there is no further conduction due to high resistance so that the temperature of the rollers is in effect self governing. Instead of heated rollers lamps could be used. Although dry development with powder has been described, a wet developing system could alternatively be used.

The developer unit for the first drum 14 can be of a conventional cascade type. A two component magnetic or liquid toner or a single component magnetic powder can be used. A separate cleaning station could be employed but a single developer-cleaning unit is to be preferred for the sake of cleanliness and lack of loss of toner, so that toner of the highest quality can be used economically. It is highly desirable that once the image is made on the memory drum 14, that drum should be able to rotate without the image being disturbed in any way which is why the developer unit 16 is retractable by means of the toggle 17. Although it is generally contemplated that the copier will be required to reproduce pages of A4 or foolscap size, nevertheless smaller or larger copies could also be readily producible. Again while there will usually be only one image of the original on the memory drum 14, and only one image at a time on the copying drum 21, it could in certain circumstances be advantageous to use multiple images around these drums if the relative sizes of original and drum surface allowed. In possible embodiments where belts rather than drums are used this possibility is more likely to be of use.

Varying the relative speeds between the original scanning device and the memory drum surface, or between the memory drum and copying drum surfaces, it is possible for the image to be elongated or foreshortened. In the case of elongation, during the first stage of the method, a higher quality of image would be obtained and presented to the copying drum, because more toner would be deposited on the memory drum. If the image were elongated at the memory drum it could subsequently be shortened onto the copying drum 21 with an excellent reproduction being obtained. It is possible, also to employ some other magnification or reduction means, for instance a zoom lens between the original and the memory drum.

An alternative to using pre-cut copy sheet is to supply copy material from a roll as it is required, and to sever it to the desired length at some appropriate point in the path to the copy outlet from the machine.

During the step of exposing the original onto the drum 14, the drum 14 will generally rotate at a relatively slow speed. During the subsequent second stage, when the image on the drum 14 is transferred as many times as desired onto the drum 21 and thence to the copy material, then drum 14 will rotate faster and in synchronism with the drum 21 unless some elongation or shortening of the image is required.

As to the size of the copy drum 21, this can be best selected on the basis of compromise between the requirements on the one hand for space around it at which to locate the imaging station, developer unit, transfer station, cleaning unit and charging station while on the other hand the smaller the diameter the more rigid the drum and the easier separation of paper at the transfer station is likely to be. Also a smaller drum is cheaper. As mentioned, the copy drum 21 will normally rotate at the same surface speed as the memory drum 14 during the second stage of the method, while during the first stage it could be running up to speed or rotating at the same speed as the memory drum or it could remain stationary.

There is no apparent limit to the speed of which copies can be taken from the drum 14 via the drum 21 to copy paper and a low intercopy gap in the supply of copy sheets can be obtained.

FIG. 1 indicates at 20, between the drums, a lens of the type comprising a tightly packed bundle of glass fibres each having a refractive index graded from the centre towards the outside. Such a lens, which is obtainable from Nippon Plate Glass Co. Ltd. under the name "Selfoc", gives low tranmission losses and a short focal length and is particularly appropriate when specular reflection is relied on.

Figure 2:
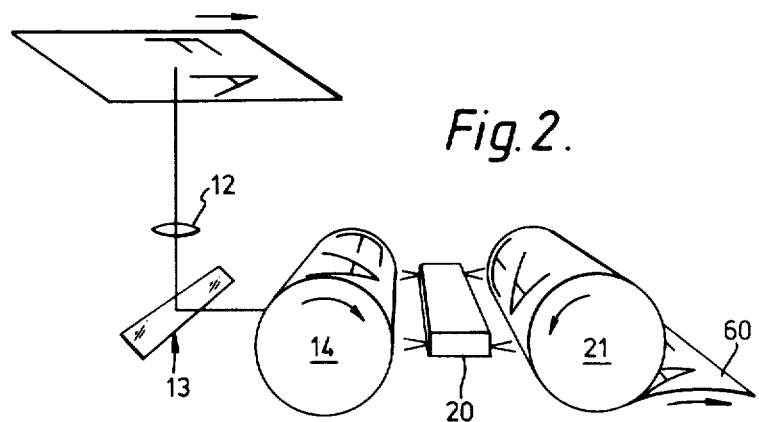
FIG. 2 is a schematic view of one embodiment of optical system for apparatus of the invention.

FIG. 2, in which with regard to FIG. 1 like parts bear like reference numerals, shows, schematically, the optical arrangement using the "Selfoc" lens and the way in which on the copy drum 21 the image is "wrong reading" and, in this case, is "right reading" on the memory drum 14.

Figure 3:
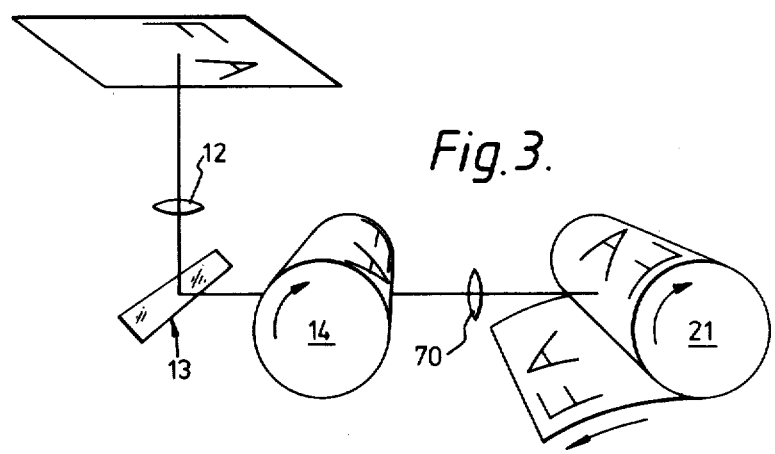
FIG. 3 is a schematic view of a second embodiment of optical system for apparatus of the invention.

FIG. 3, shows a variation where a conventional lens 70 is employed and again the image is wrong reading on the drum 21.

Figure 4:
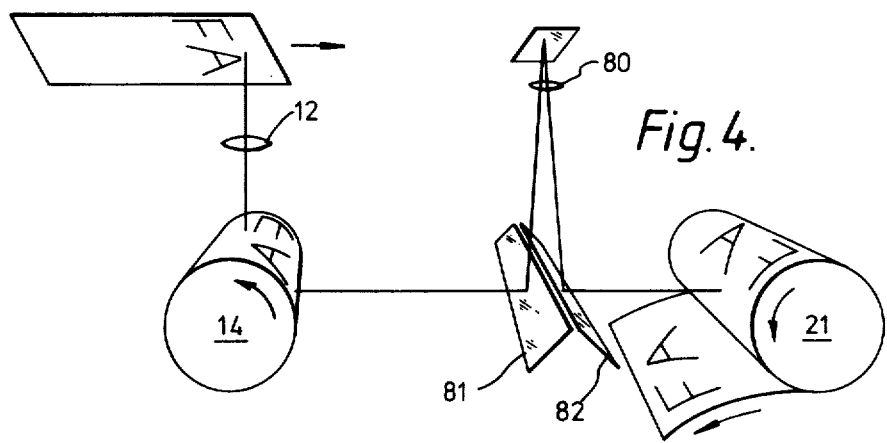
FIG. 4 is a schematic view of a third embodiment of optical system for apparatus of the invention.

FIG. 4 shows a further variation, again using a conventional lens 80, which allows shortening of the inter-drum path. Additional mirrors 81, 82 are used so that while the optical path can remain of the required length the actual inter-drum spacing is reduced although for clarity it is not so shown.

Figure 5:
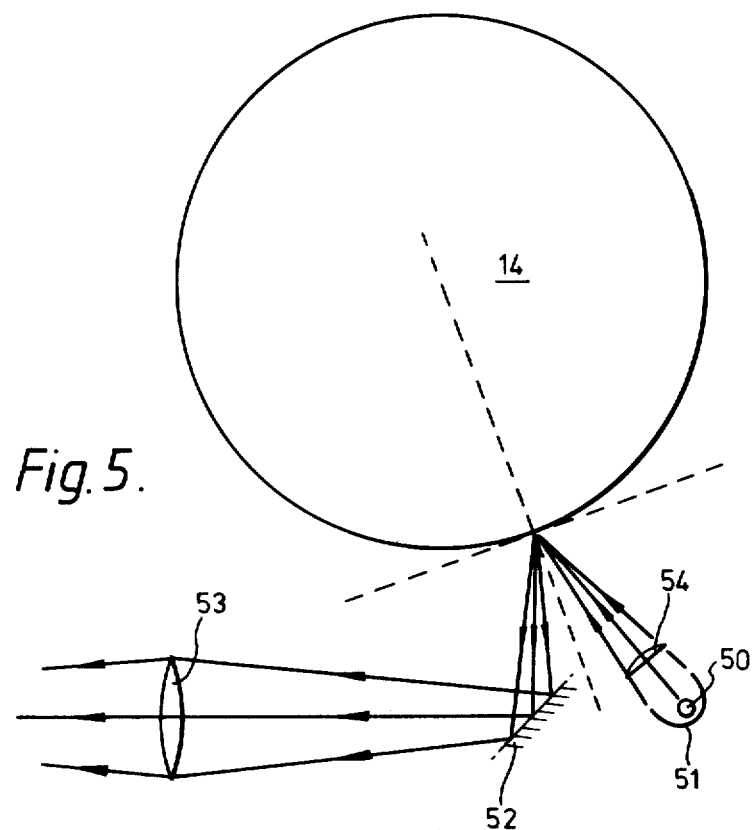
FIG. 5 is a schematic view in greater detail of a part of an optical system for apparatus of the invention.

FIG. 5 illustrates a possible optical system for obtaining an image from the first, memory, drum 14 for application to the copying drum 21 (not shown). The memory drum 14 is illuminated, via a cylindrical lens 54 at an angle to the radius to the point of illumination, by a lamp 50 with a reflector 51 on one side, and light reflected from the un-toned surface, but not from the toner because of the specular contrast which is here relied on, is diverted by a mirror 52 through a lens 53 of conventional type. The lens 53 need only collect light over a small angle so that the illumination need only be over the same small angle. It is preferable with this arrangement to use a fluorescence or discharge lamp as the light source and this should be longer than the width of the first drum 14. Poor copies might arise were a conventional tungsten halogen lamp employed because this would be biassed towards the ends to compensate for lamp end effects and transmission variations in the lens and in addition only segments of the filament emit light. This is not a problem in normal copying where colour contrast is relied on because scattered light is collected. However, with specular contrast, segments of the lamp would be shown on the eventual copy due to the mirror-like qualities of the photoconductor, the non-emitting parts being represented as dark stripes. Because the memory drum 14 is imaged at an angle, the resolution of the system will be imperfect but as suggested in FIG. 6 at A improvement can be made in this respect by tilting the optical system between the drums 14 and 21 which puts the object in focus throughout its area.

Figure 6:
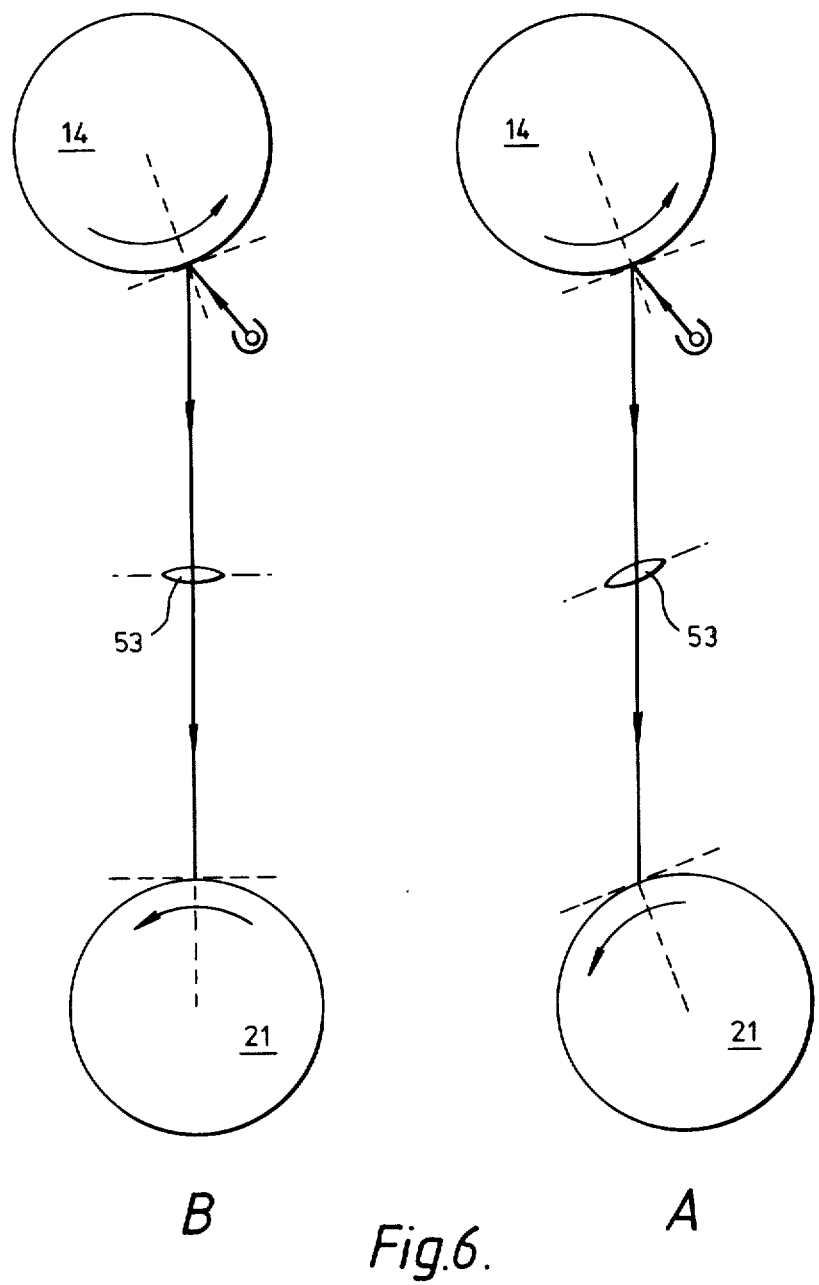
FIG. 6 illustrates a preferred feature of the partial system of FIG. 5.

The arrangement at B in FIG. 6 is one where there is not tilting and wherein resolution will be not so good because the object plane (shown dashed) is inclined to the plane of focus (shown dotted).

Figure 7:
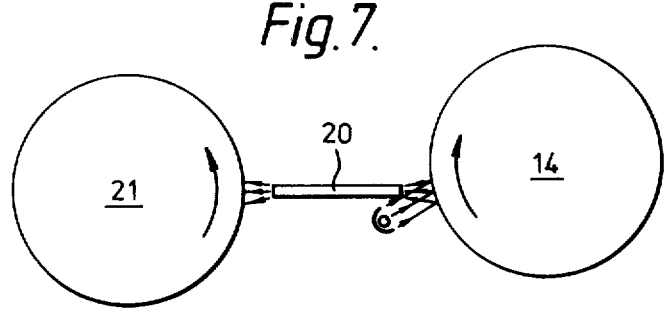
FIG. 7 is a schematic view of an alternative part of an optical system.

FIG. 7 illustrates, on the other hand, the space saving possibilities of a "Selfoc" lens as already described. Again the memory drum 14 is illuminated by a lamp, which can be of lower power due to the good transmission of such a lens, and can thus be closer to the drum 14 without affecting the toner image thereon. The lens 20 has a short focal length and allows drums 14 and 21 to be close together. An even output lamp is again required. The arrangement is particularly useful where specular contrast is relied on because in effect a collimated light system is then employed so that the contrast is particularly clearly reproduced given the excellent reflectivity of the photoconductor and light absorption of toner.

A "Selfoc" lens gives a 1 to 1 image so no image elongation or shortening is available at the stage at which it is used.

The copy rate of the machine may be varied depending on the size and orientation of the copy paper employed and the required intercopy gap but 100 cpm fed landscape is considered readily possible, and if the copy gap was then 50 mm the process speed required would be 43 cm/sec.

Many modifications can be made. For instance at the first surface separate but interconnected developer and cleaning units can be used to allow reuse of developer powder. Also it is possible to use a Selfoc lens in the light path by which the first surface receives an image of the original.

We claim:

1. A copying system comprising in combination a first, memory, photoconductive surface, means to form and develop an electrostatic image of an original on said first, memory, photoconductive surface, a second photoconductive surface, positioned adjacent said first photoconductive surface means repeatedly forming on said second photoconductive surface second electrostatic images of the developed image on the first surface by illumination of the first surface, said second electrostatic images being identical with each other and corresponding to the first electrostatic image, means to transfer the second images from the second surface to copy material, and means to develop said second images.

2. A system as claimed in claim 1, wherein both photoconductive surfaces comprise endless surfaces.

3. A system as claimed in claim 1, wherein said means to develop the second images comprises a developer associated with said second surface.

4. A system as claimed in claim 1, further comprising means to move the first surface alternatively at a low speed, for forming and developing the electrostatic image thereon, and at a high speed, when illuminating that image and forming the second electrostatic images.

5. A system as claimed in claim 1 or 4 and further comprising a single developer/cleaner unit associated with said first surface, whereby toner developer material employed on the first surface can be reused.

6. A system as claimed in claim 1 or 4 including a cleaning means for the first surface and wherein said developer means and cleaning means are movable away from said first surface.

7. A system as claimed in claim 1 or 4, wherein the second photoconductive surface is of a material selected from the group consisting of pure and doped selenium, zinc oxide and cadmium sulphide.

8. A system as claimed in claim 1 or 4, wherein said first photoconductive surface and developer material therefor display contrasting reflectivities, such that upon illumination thereof the image is represented by specular reflection.

9. A system as claimed in claim 8, wherein the first surface is one of selenium and a selenium alloy and the developer material scatters and absorbs light.

10. A system as claimed in claim 1, 4 or 8, further comprising, means for illumination of the first surface and image formation on the second surface, a lens arrangement comprising a bundle of optical fibres each graded radially as to refractive index.

11. A system as claimed in claim 1, 4 or 8, further comprising a fuser unit for heat setting developer material on the copy material, and wherein said fuser unit includes rollers coated with a material having a positive thermal coefficient of electrical resistance.

12. A method of producing copies of an original by forming and developing an electrostatic image of the original on a first, memory, photoconductive surface, repeatedly forming on a second photoconductive surface positioned adjacent said first photoconductive surface, second electrostatic images of the developed image on the first surface by illumination of the first surface, said second electrostatic images being identical with each other and corresponding to the first electrostatic image, transferring the second images from the second surface to copy material and developing the second images.

13. A method as claimed in claim 12, wherein the second images are developed on the second surface and then transferred to copy material.

14. A method as claimed in claim 12 or 13, wherein the first surface is driven at a low speed when forming and developing the electrostatic image thereon and at a high speed when that image is illuminated and the second images are formed.

15. A method as claimed in claim 12 or 13, wherein developer material is applied to, and subsequently cleaned from, the first surface by a single unit and developer material is reused for successive images on the first surface.

16. A method as claimed in any one of claims 12, or 13 wherein specular reflection between the first surface and developer material thereon is employed for imagewise illumination of the second surface.

17. A method as claimed in any one of claims 12, or 13 wherein, in forming the second electrostatic images, the first surface is illuminated via a lens arrangement comprising a bundle of optical fibres each graded radially as to refractive index.

18. A method as claimed in claim 14, wherein specular reflection between the first surface and developer material thereon is employed for imagewise illumination of the second surface.

19. A method as claimed in claim 14, wherein, in forming the second electrostatic images, the first surface is illuminated via a lens arrangement comprising a bundle of optical fibres each graded radially as to refractive index.

* * * * *